Figure 1:
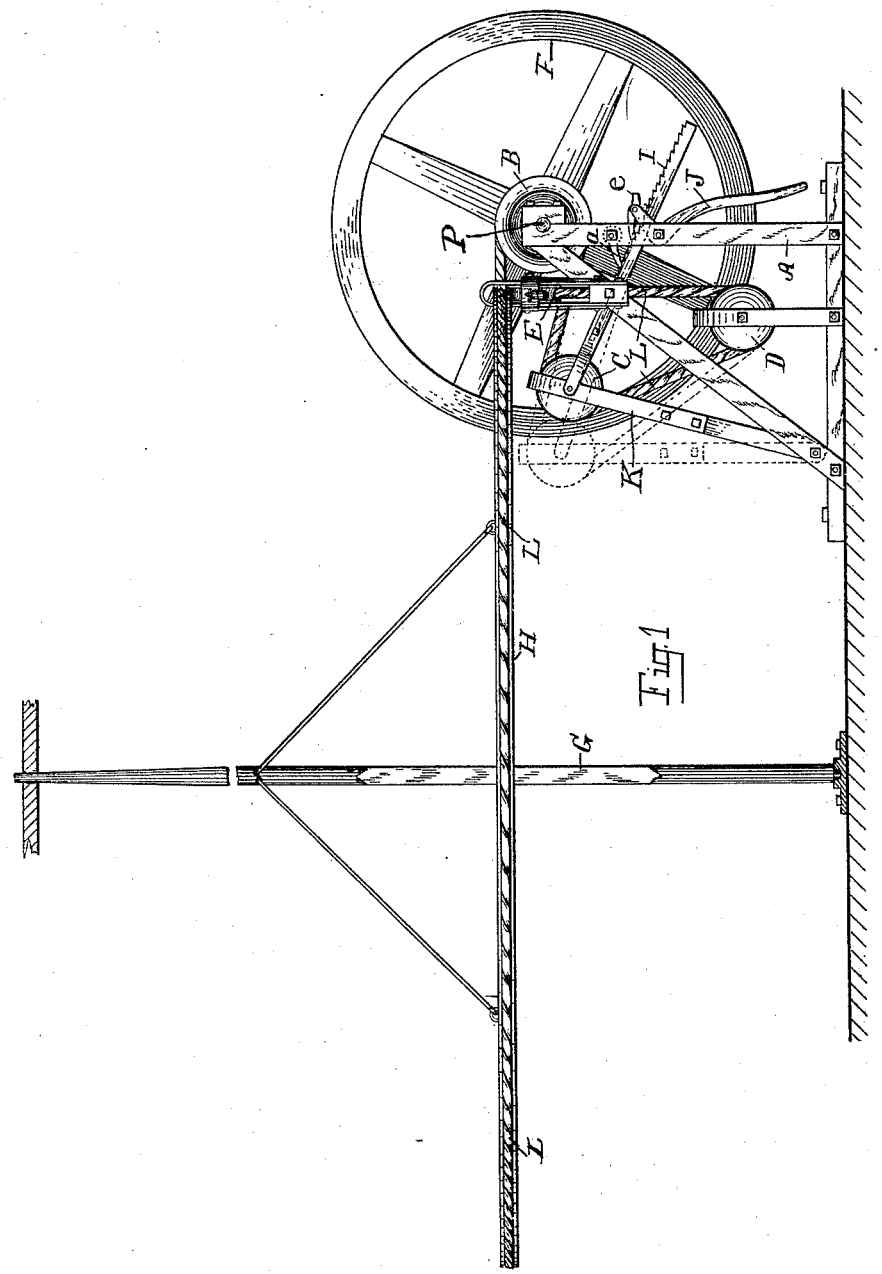

(No Model.) 2 Sheets—Sheet 1.
A. M. WEAD.
HORSE POWER.

No. 473,683. Patented Apr. 26, 1892.

Witnesses:
Walter S. Wood
M. Irene Longyear

Inventor.
Andrew M. Wead
By Lucius C. West
Att'y.

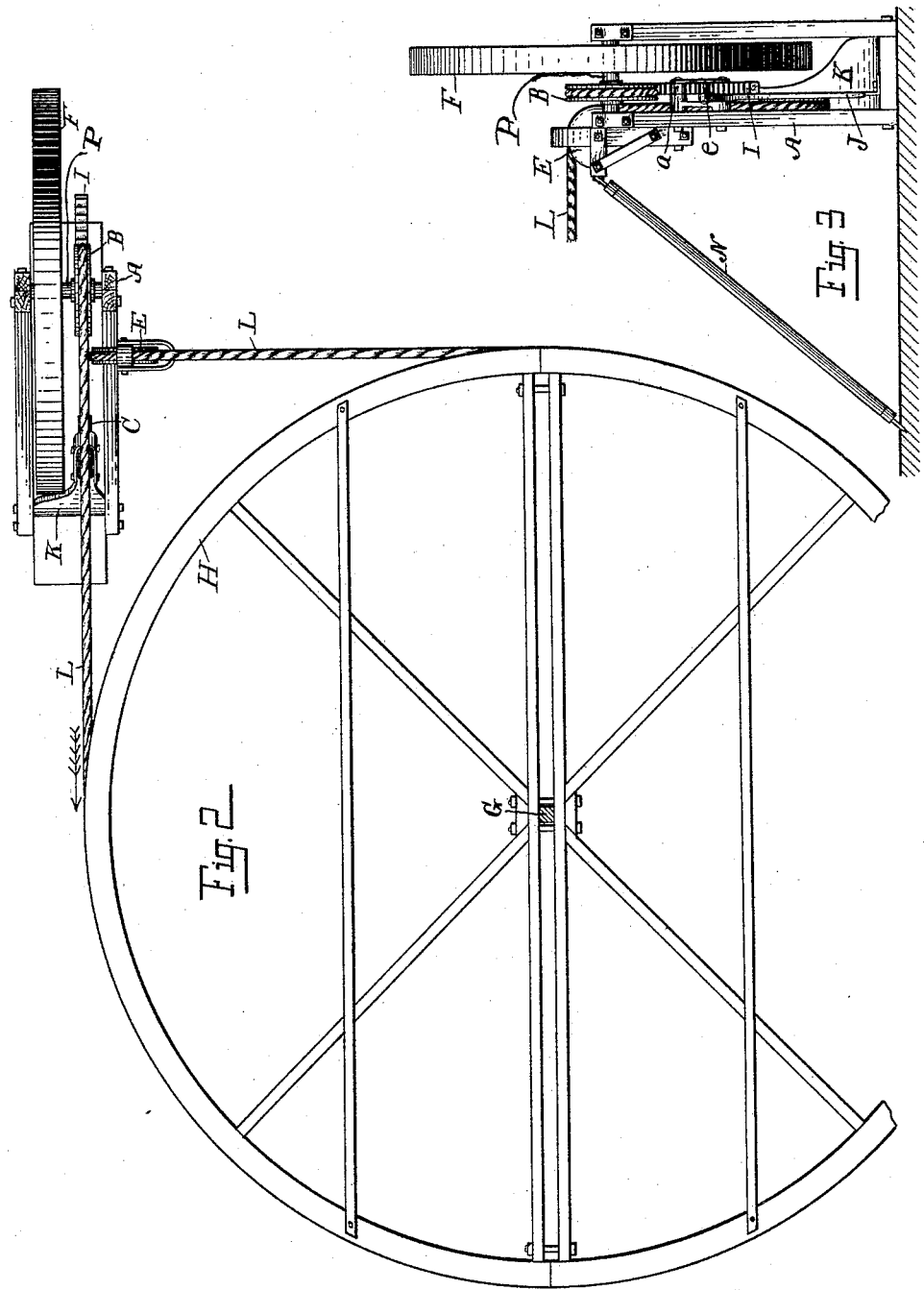

UNITED STATES PATENT OFFICE.

ANDREW M. WEAD, OF KALAMAZOO, MICHIGAN, ASSIGNOR TO KIRK A. SMITH AND WILLIS N. POMEROY, OF SAME PLACE.

HORSE-POWER.

SPECIFICATION forming part of Letters Patent No. 473,683, dated April 26, 1892.

Application filed January 21, 1892. Serial No. 418,786. (No model.)

*To all whom it may concern:*

Be it known that I, ANDREW M. WEAD, a citizen of the United States, residing at Kalamazoo, county of Kalamazoo, State of Michigan, have invented a new and useful Horse-Power, of which the following is a specification.

This invention relates to that class of horse-powers which consists of a sweep made in the form of a pulley and to which sweep the horse is attached, and a shaft bearing a belt-wheel, to which shaft power is transmitted from the sweep by means of an endless rope belt or cable, and an adjustable arm bearing a tensioning-pulley for tightening said rope belt or cable.

The object of the invention is to enable the operator to institute an increased tension with a decrease in exertion, thus facilitating the operation and adding to the utility.

To this end the invention consists in the peculiar construction and combination of parts, substantially as below described and claimed.

In the drawings forming a part of this specification, Figure 1 is a side elevation; Fig. 2, a plan view of Fig. 1, and Fig. 3 an elevation looking from a point at the right of Fig. 1.

These machines are known to the trade as "barn-floor horse-powers" from the fact that they are used in barns, the sweep H being attached at its axial center to a vertical axis G, which axis has bearings at the base on the barn-floor and bearings at the top in a suitable beam or scantling provided for the purpose, so that when the horse is attached to the sweep at some point inside of the periphery it will cause the sweep H to revolve in its horizontal position as the horse travels round and round.

At A is shown a frame-work extending upward from the floor, in the upper end of which a power-shaft P, Figs. 2 and 3, has bearings, which power-shaft carries pulleys F and B. The periphery of the sweep H is grooved, as is also the pulley B of said power-shaft, and the rope belt or cable L is passed around the sweep and around said pulley.

For the purpose of tensioning the belt L, I have provided the machine with two pulleys E and D, one above the other, as shown in Figs. 1 and 3, and with a tensioning-pulley C, the latter of which pulleys is mounted in the upper end of the arm K, which arm is pivoted at the lower end, so as to be swung outward to tension the belt L, which will be explained in the operation. Pivotally attached to the upper end of the arm K is a rack I (which rack is operated by a lever J) and a pawl *e*, which pawl is pivotally attached to said lever, as in Fig. 1. This lever J is made in elbow form and is pivotally attached to the bend of the elbow to the upright frame-work A. Pivotally attached to said frame-work just above the rack I is another pawl *a*, the function of which will be explained in the operation.

In Fig. 3 is shown a brace at N, which is employed to hold the frame A in its upright position, as in ordinary machines of this class.

In the operation, when it is desired to tighten the belt L, the operator raises the handle of the lever J, which action, by the engagement of the pawl *e* with the rack I, forces said rack outward, thus causing the arm K to move outward, carrying its pulley C with it, and by this means taking up the slack in the belt L, as indicated by dotted lines in Fig. 1. During this operation the pawl *a* locks the rack I from backward movement and holds whatever the operator gains during the operation.

It will be seen that by the use of the elbow-lever J and the rack and the pawls in connection with the pivoted arm K a powerful tension can be exerted on the belt with but little exertion of the operator and without any necessity of his holding by his own strength whatever tension he gains step by step during the operation.

It will of course be understood in the use of these machines that power is transmitted from the pulley F to different mechanism, such as corn-shellers, straw-cutters, &c.

Having thus described my invention, what I claim as new, and desire to secure by Letters Patent of the United States, is—

In a horse-power, the combination of the horizontal wheel-like sweep, a suitable frame, a power-shaft having bearings in said frame, a pulley carried by said power-shaft, the tensioning-arm pivoted to the frame at one end and bearing a pulley at its free end, the rack pivoted at one end to said tensioning-arm, the elbow-lever bearing a pawl for operating said rack, a pawl pivoted to the frame in position to engage the rack and lock it in different positions, the two pulleys having fixed bearing-supports in the frame, and a rope belt or cable passed around the periphery of the sweep and around each of the above-named pulleys, substantially as set forth.

In testimony to the foregoing I have hereunto subscribed my name in the presence of two witnesses.

ANDREW M. WEAD.

Witnesses:
WILLIS N. POMEROY,
N. G. LESLIE.